(12) United States Patent
Counas

(10) Patent No.: US 10,691,071 B2
(45) Date of Patent: *Jun. 23, 2020

(54) MOBILE APPARATUS ABLE TO EQUIP AND PROTECT A WATCH AND WATCH EQUIPPED WITH SUCH A MOBILE APPARATUS

(71) Applicant: Pascal Counas, Nassau (BS)

(72) Inventor: Pascal Counas, Nassau (BS)

( * ) Notice: Subject to any disclaimer, the term of this patent is extended or adjusted under 35 U.S.C. 154(b) by 0 days.

This patent is subject to a terminal disclaimer.

(21) Appl. No.: 16/408,908

(22) Filed: May 10, 2019

(65) Prior Publication Data

US 2019/0265650 A1    Aug. 29, 2019

Related U.S. Application Data

(62) Division of application No. 15/030,260, filed as application No. PCT/EP2014/072337 on Oct. 17, 2014, now Pat. No. 10,331,080.

(30) Foreign Application Priority Data

Oct. 18, 2013    (FR) ..................... 13 60200

(51) Int. Cl.
*G04B 25/00*    (2006.01)
*G04G 17/08*    (2006.01)
(Continued)

(52) U.S. Cl.
CPC ............. *G04B 37/12* (2013.01); *G04B 25/00* (2013.01); *G04G 17/083* (2013.01); *G04G 21/04* (2013.01);
(Continued)

(58) Field of Classification Search
CPC ...... G04B 25/00; G04B 37/12; G04G 17/083; G04G 21/04
See application file for complete search history.

(56) References Cited

U.S. PATENT DOCUMENTS 6,464,390 B1   10/2002  Baroche
6,600,527 B1    7/2003  Basturk et al.
(Continued)

FOREIGN PATENT DOCUMENTS

EP    1175017 A2   1/2002
JP    3041545 U    9/1997
(Continued)

*Primary Examiner* — Edwin A. Leon
*Assistant Examiner* — Jason M Collins
(74) *Attorney, Agent, or Firm* — Greer, Burns & Crain, Ltd.

(57) ABSTRACT

A mobile apparatus is provided that is able to equip any object of value, such as a watch or piece of jewelry, and protect it. The present mobile apparatus includes: an electronic module able to execute a mobile application, a display screen connected to the electronic module and arranged to display information relative to the mobile application, and a fastening support whereof the shapes and dimensions are arranged so that the mobile apparatus can successively equip any object of value, and to be able to fasten, removably and by superposition, at least one display screen to an object of value when object of value is attached around part of a human body. In addition, the mobile apparatus covers at least part of a surface of the object of value designed to be easily visible by the person when the object is worn.

16 Claims, 13 Drawing Sheets

(51) Int. Cl.
  *G04G 21/04*  (2013.01)
  *G04B 37/12*  (2006.01)
  *G06F 1/16*   (2006.01)
(52) U.S. Cl.
  CPC ............ *G06F 1/163* (2013.01); *G06F 1/1632* (2013.01); *G06F 2200/1633* (2013.01)

(56) References Cited

U.S. PATENT DOCUMENTS

| | | |
|---|---|---|
| 6,754,069 B2 | 6/2004 | Harada |
| 6,801,476 B2 | 10/2004 | Gilmour |
| 7,226,321 B2 | 6/2007 | Uhari |
| 7,946,758 B2 | 5/2011 | Mooring |
| 8,279,716 B1 | 10/2012 | Gossweiler, III et al. |
| 2004/0093897 A1 | 5/2004 | Weissbuch |
| 2005/0286212 A1 | 12/2005 | Brignone et al. |
| 2007/0246494 A1 | 10/2007 | Kim et al. |
| 2007/0279852 A1 | 12/2007 | Daniel et al. |
| 2011/0176395 A1 | 7/2011 | Mooring |
| 2013/0107674 A1 | 5/2013 | Gossweiler, III et al. |
| 2016/0174674 A1* | 6/2016 | Oberpriller ............. A45F 5/021 224/222 |

FOREIGN PATENT DOCUMENTS

| | | |
|---|---|---|
| JP | H1079980 A | 3/1998 |
| WO | 02/052358 A1 | 7/2002 |

\* cited by examiner

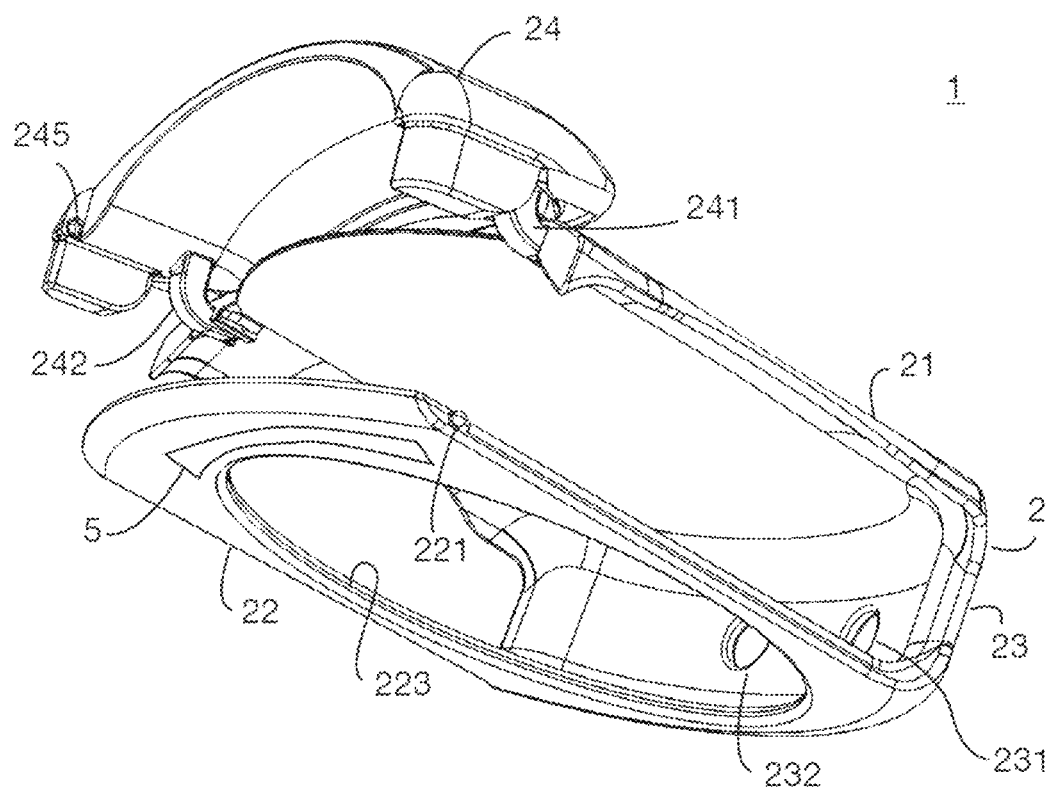
Fig. 3
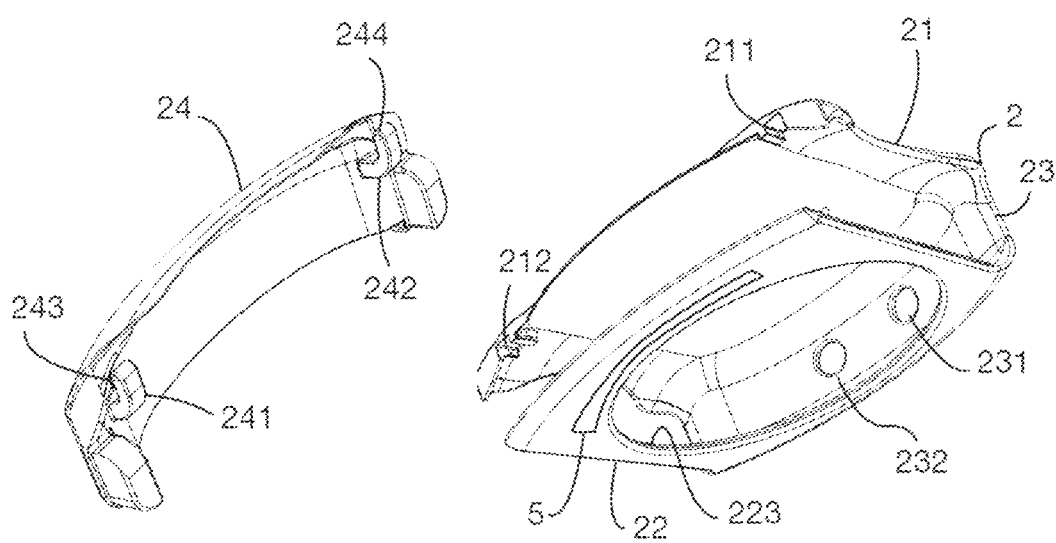
Fig. 4A                    Fig. 4B

MOBILE APPARATUS ABLE TO EQUIP AND PROTECT A WATCH AND WATCH EQUIPPED WITH SUCH A MOBILE APPARATUS

RELATED APPLICATION

This application is a divisional of, and claims 35 USC 120 priority from U.S. patent application Ser. No. 15/030,260 filed Apr. 18, 2016, the contents of which are incorporated by reference herein.

TECHNICAL FIELD

The invention relates to the field of mobile electronic devices and, more precisely, to the field of mobile devices intended to be worn by a human being. It relates to such a mobile device intended to equip an item of value worn around a part of the body of a person, for example a watch. This mobile device, apart from its technical information and communication functions, also makes it possible to protect an item of value against the risks of damage, depending on the whereabouts and change in activity of the wearer. The invention also relates to an assembly comprising a watch and a mobile device equipping the watch, and an assembly comprising a mobile device and an interactive platform. It also relates to an interactive protective casing and a docking station for the interactive protective casing.

BACKGROUND

On the one hand, the 16th century saw the birth of the luxury watch industry, with a tradition of making mechanical watches that has been handed down for more than 400 years. On the other hand, the miniaturization of electronic circuits and the increase in capacity of portable power sources have led to the introduction of numerous electronic devices. In particular, at the end of the 1960s, the first watches incorporating a quartz oscillator appeared. A few years later, the analogue display with hands was replaced by a digital display. Since then, two main development routes have been followed by designers of watches, with some pursuing the production of essentially mechanical watches, and others being committed to the production of purely electronic watches.

These two routes have developed in parallel, never or almost never overlapping.

Mechanical watches, or watches with a mechanical movement, have undergone a considerable number of developments, in particular in the creation of new complexities, but these developments are almost exclusively based on purely mechanical techniques, without the use of any electronic circuit apart from optionally the quartz oscillator and its power supply. In any case, the designers of mechanical watches have sought to retain the maximum amount of mechanical movement for measuring and displaying time, while keeping to an absolute minimum the introduction of electronic circuits for performing associated functions. For this reason, mechanical watches are often referred to by the expression "traditionally made watches".

Furthermore, the cost of mechanical watches has remained relatively unchanged in comparison with that of electronic watches, which has fallen sharply. Thus, mechanical watches have gradually come to be regarded as luxury items, with prices ranging from several thousand euros to several million euros. Production runs of mechanical watches are limited to approximately three million per annum and globally amount to approximately one hundred million units.

Moreover, electronic watches have developed greatly since the introduction of the digital display. The watch case has gradually incorporated new functions, as the calculation capacities of integrated circuits have increased and their power consumption has reduced. Certain watches have for example incorporated a calculator function, a satellite positioning system, or also a player of digital music files. Nowadays, watches incorporate functions that are even more sophisticated, and above all more numerous, most often being based on a hardware and software architecture identical or similar to that of a mobile device. By mobile device or apparatus, is meant a computer device suitable for being carried and used when a user is on the move. In particular, the mobile device must comprise autonomous power supply means. It may in particular be a portable computer, a "personal digital assistant" or also a "smart phone". In reality, electronic watches nowadays correspond to mobile devices in the general form of a watch. They are thus called "smart watches". However, their aesthetic appearance and technical elegance is radically changed, and the functionalities offered make the time display of secondary importance.

Unlike mechanical watches, electronic watches, even expensive ones, are not considered luxury items, but are aimed at customers who are enthusiastic about new information and communication technologies.

Consequently, mechanical watches and electronic watches belong to two fields that are not only different from one another, but also completely isolated from, or even opposed to one another. If it seems impossible to envisage a synergy between mechanical watches and electronic watches, the fact remains that each type of watch has limitations as regards the expectations of some customers. On the one hand, current electronic watches suffer rejection by the wearers of mechanical watches, the latter being attached to the craftsmanship and aesthetic value of these watches. On the other hand, mechanical watches fulfil none of the functions accessible to smart watches. A user cannot therefore have access to the features of both these types of watches simultaneously, except by wearing two different watches. However, it has in practice proved inconvenient to multiply the elements worn by a person, in particular on a wrist strap.

SUMMARY

A purpose of the invention is in particular to overcome some or all of the aforementioned drawbacks by proposing a new paradigm in the field of watches. This paradigm is based on the possibility of incorporating the functionalities of a smart watch into a mechanical watch, preferably in a reversible manner. This incorporation consists of providing an electronic module fulfilling the functionalities of a smart watch, and a display screen connected to the electronic module, capable of being mechanically coupled to a watch of the traditional type. More generally, the invention aims to incorporate functionalities of mobile applications into an item, in particular an item worn or attached around a part of a living being, generally a human being. By item of value, is meant any piece of jewelry such as a bracelet, a watch, a chain or a pendant, for example made of a precious metal, and any electronic device designed to be worn by a living being. The electronic device can in particular be an electronic watch or a health bracelet. When the mobile device equips an electronic watch, it makes it possible to add functionalities to those already present in the electronic watch. The health bracelet, also called a fitness bracelet, usually has the general shape of a wristwatch and can comprise various sensors such as a movement sensor, a temperature sensor, and a heart-rate monitor. The item of value can be worn around the waist, wrist, ankle, or neck of the living being.

More precisely, the invention relates to a mobile device capable of equipping any item, in particular an item of value, worn or attached around a part of the body of a living being, preferably a human being, the mobile device comprising:

an electronic module capable of running a mobile application, a display screen connected to the electronic module and designed to display information relating to the mobile application, and a fastening support designed to fasten the display screen to an item in a detachable manner, when said item is worn or attached around a part of the living being's body.

According to a particular embodiment, the mobile device is capable of protecting and equipping, by superimposition, any item worn or attached around a part of the body of a human being, such as the waist, wrist, ankle, or neck, the item comprising a first outer surface intended to be easily visible to the human being when wearing the item, the mobile device comprising:

an electronic module capable of running a mobile application, a display screen connected to the electronic module and designed to display information relating to the mobile application, and a fastening support, the shapes and dimensions of which are designed so that the mobile device can successively equip any item worn by the human being, and in order to be able to fasten at least the display screen to an item, in a detachable manner and by superimposition, when said item is attached around a part of the body of the human being, the mobile device being designed so that, when the display screen is fastened to the item, it covers at least a part of the first outer surface of this item.

The electronic module must be capable of running one or more mobile applications. By mobile application, is meant any computer software containing a sequence of instructions carried out with a view to fulfilling a given functionality. By way of example, the mobile application can consist of a video game, an electronic organizer, or a digital music reader. The mobile device can also provide mobile applications that are known as thus-named connected applications, i.e. exchanging data with external devices, by wired connection or wirelessly. In particular, the mobile applications can be an e-mail client, a web browser, or a global navigation satellite system assistant. The mobile device according to the invention can also communicate with other mobile devices, in particular with a personal digital assistant or a mobile telephone. The electronic module can then run mobile applications managing the sending and receiving of telephone calls and short messages (SMS) by the mobile telephone, and allowing remote consultation of information contained in an external mobile device, such as an electronic organizer or photos. Of course, these examples of applications are not limitative and many other applications can be envisaged, depending on the resources of the mobile device.

The mobile device according to the invention is provided in order to equip any item, in particular any item of value, worn or attached around a part of the body of a living being. In the case in point, the fastening support makes it possible to "affix" at least the display screen onto the item of value, so that this item of value has a display screen providing functionalities identical or similar to those of any mobile device. Preferably, the display screen is secured to the item of value, or a part of the item of value. In particular, when the item of value comprises a screen or a surface displaying information, for example a watch face, the display screen of the mobile device according to the invention is secured to the screen or the information display surface. The display screen of the mobile device can also cover another part of the item or the item of value. It can in particular cover a watch strap or gems in a piece of jewelry.

The mobile device can in particular equip any type of watch, irrespective of its mechanism, shape, and means of attachment to a user. In the case in point, the watch can be a wristwatch, a pocket watch, a pendant watch, a mechanical watch, a quartz watch, a watch with an analogue or digital display. The mobile device can moreover equip a health bracelet, a piece of jewelry or any electronic device.

The electronic module can comprise a field programmable gate array, or FPGA. It can also comprise a memory capable of storing the mobile application and data processed by the mobile application, and a processor or a microprocessor capable of running the mobile application.

The display screen is for example a liquid crystal display (LCD) screen, a light-emitting diode (LED) screen or an organic light-emitting diode (OLED) screen. The screen can comprise Gorilla Glass (registered trade mark) or Willow Glass (trade mark). Other display technologies can of course be used.

The mobile device preferably comprises an acquisition interface designed to allow the user to enter data that can be used by the mobile application. This acquisition interface forms an input peripheral for the electronic module. It can be one or more switches, for example pushbuttons, or a keyboard. The acquisition interface can also be formed by providing a touch display screen.

According to a preferred embodiment characteristic, the mobile device according to the invention is produced so as to minimize the change in appearance of the item of value that it is to equip. The mobile device can be designed so as to leave the maximum amount of the item of value that it is to equip visible. The different components of the mobile device can have reduced dimensions and/or be produced with transparent materials. In particular, the fastening support can be made of a transparent material, for example transparent ceramic or transparent plastic, Gorilla (registered trade mark) Glass or Willow (trade mark) Glass. The mobile device can have a shape substantially similar to the shape of the item of value to be equipped with dimensions substantially greater than those of the item of value or of the part to be equipped, preferably by superimposition. The mobile device can thus protect the item of value or a part against the risks of damage, depending on the whereabouts and change in activity of the wearer. According to a particular embodiment, the fastening support has shapes and dimensions designed so that the mobile device can successively equip different items worn by the human being, and so as to be able to fasten at least the display screen to the item considered, in a detachable manner and by superimposition. In practice, the fastening support can have dimensions substantially greater than those of the items that it is to equip. It should be noted that the fastening support can be suitable for equipping items the dimensions of which differ substantially from one item to another. In order to do this, the fastening support can have dimensions each of which is at least equal to the greatest respective dimension of the different items to be equipped. The fastening support can, in addition or instead, have a certain elasticity.

The mobile device can also comprise means for communicating data with other pieces of electronic equipment, in particular other mobile devices such as a mobile phone. These means can be wireless communication means. By way of example, the mobile device can comprise a transmitter-receiver based on Bluetooth technology (IEEE 802.15.1 standard) or Wi-Fi (IEEE 802.11 standard). The mobile device according to the invention can then exchange data with other pieces of electronic equipment, in particular in order to control them and/or to display on the display screen, information contained in and/or processed by these pieces of electronic equipment. In the case in point, the wireless communication means can make it possible to synchronize data with one or more pieces of electronic equipment. The mobile device can also constitute a computer terminal of a computer network, in particular in "cloud computing".

According to a particular embodiment, the mobile device also comprises means for generating and/or storing secure data. The secure data can be data relating to the wearer of the item of value, for example information on their state of health (medical passport), banking details, and/or codes giving access to buildings, hotel rooms, or vehicles. The means for generating and/or storing secure data can consist of a data encryption algorithm, or a storage memory. The memory can in particular be designed to prevent the stored data being read without the user's authorization. The memory can in particular be inaccessible for reading by a device other than the mobile device. The stored data can be encrypted.

The mobile device according to the invention is particularly suitable for an item of value comprising a case, for example a watch or a health bracelet. The mobile device can then be fastened to the case. By case is meant any container capable of holding components. The case can have various general shapes, in particular cylindrical or parallelepipedal. It comprises a first outer surface intended to be seen easily by the living being when wearing the item of value. In the case of a watch, the first outer surface corresponds to the surface on which the watch face indicating the time is formed. In the case of a wristwatch, this surface is opposite the surface which comes into contact with the user's wrist. The first outer surface, and in particular the watch face, may or may not be covered by a protective glass. The first outer surface and the watch face can have a flat or curved surface. The mobile device is adapted to the shape of the case. In particular, it can be designed so that, when the display screen is fastened to the item of value, it covers at least a part of the first outer surface of the case. Preferably, the fastening support is designed to be able to fasten the display screen to the case. According to other embodiments, the mobile device can be designed to cover other parts of an item of value, in particular a bracelet.

In order to facilitate the use of the mobile device, the latter can be designed so that, when the display screen is fastened to the item of value, it covers at least a part of the first outer surface of the case. It can in particular cover a top or bottom half of this first surface, or the whole of this first surface. The user or the wearer of the item of value thus intuitively accesses the information relating to the mobile application. It should be noted that, in the case of a watch, when the first outer surface of the watch is covered by a protective glass, the display screen fits on top of this protective glass.

Still with the aim of limiting the change in appearance of the item of value equipped with the mobile device, the display screen, covering at least a part of the first outer surface of the case, is designed so as to leave this first outer surface visible in the absence of information displayed on the display screen. In other words, the display screen is capable of adopting a state in which it appears transparent to the user of the watch. Of course the screen can be partially opaque, in particular at its edges where the control electronics are arranged. Preferably, over at least 80% of its surface, corresponding to its display surface, the screen has a transmission coefficient greater than or equal to 50% (advantageously greater than or equal to 75%) in the wavelength band visible to the living being wearing the item of value (between approximately 380 nm and approximately 780 nm in the case of a human being).

According to another feature of the invention, the mobile device can form a device for protecting the item of value that it equips, while allowing complete or partial transparency over the latter, and thus ensuring an attractive aesthetic appearance of the mobile device-item of value assembly. The mobile device can cover all or part of the item of value, in particular all or part of the case of a watch, the latter element being a single non-replaceable part, as no spare part is available from luxury watch manufacturers. It then protects the item of value from impacts and friction against other items. It can also be provided in order to protect the item of value from ultraviolet radiation. The mobile device can also form a compartment that is impervious to certain fluids, in particular water, and sand.

More particularly, the fastening support can comprise a part, called a cover, designed so that, when the display screen is fastened to the item of value, this part covers at least a part of the first outer surface of the case.

The display screen, covering at least a part of the first outer surface, can then form all or part of the cover of the fastening support.

The case of the item of value can comprise a second outer surface forming a back of the case. In the case of a wristwatch, the back corresponds to the surface coming into contact with the user's wrist.

According to a particular embodiment, the fastening support comprises another part, called the back support, designed so that when the fastening support is fastened to the item of value, the back support covers at least a part of the back of the case. The cover and the back support then define between them a protective compartment capable of receiving the case. This compartment can envelop the whole case, or only a part thereof. Thus, the fastening support has a shape substantially similar or complementary to the shape of the case or a part thereof to be protected, and dimensions substantially greater than those of the case or of the part to be protected.

The fastening support can also comprise a side flank mechanically linking the cover and the back support, so as to form a U. The cover forms a first arm of the U, the back a second arm of the U, and the side flank a part linking the two arms of the U. The mobile device can thus be coupled to the case by sliding, while the item of value is in place on the user. Advantageously, the back of the fastening support has a relatively small thickness, for example less than or equal to 2 mm, in order to be able to be introduced between the back of the watch case and the user's wrist without having to loosen the watch strap.

With the aim of reinforcing the protection of the watch, the fastening support can also comprise a closing side cover capable of adopting a first thus-named open position, in which the fastening support can be put in place on the case by sliding, and a second thus-named closed position, in which the closing side cover closes an open portion of the U. In other words, in the closed position, the fastening support forms a closed O-shaped contour.

In another version of the device according to the invention, the cover can be mounted on the back support by means of a hinge, a "T"-, "U"-, or "L"-shaped slide or any other suitable means. Similarly, the side cover can be mounted on the cover by means of a hinge, a "T"-, "U"-, or "L"-shaped slide or any other suitable means.

The mobile device can comprise autonomous power supply means, i.e. independent of the item of value equipped with the mobile device. The power supply means can be incorporated into the same casing as the electronic module and the other components of the mobile device, or all or part of it can be located separately. By way of example, the power supply means can be designed to be fastened to the wrist strap of the item of value. The power supply means can comprise a cell or a battery. They can also comprise a solar energy collector or an infrared wave collector. The power supply means can also comprise means for generating electrical power by movement, by induction charging means, by ambient backscatter, or by means for recovering the electrical and/or mechanical energy from the mechanism of the watch equipped with the mobile device. Ambient backscatter is a new technology which makes it possible to use the energy contained in the surrounding waves present around an item in order to generate energy for applications that consume it.

According to a first embodiment variant of the invention, the electronic module is not incorporated into the case of the item of value, for example into the watch case. It can in particular be incorporated into the back support of the fastening support. In this case it is not visible to the user when the mobile device is in place on the item of value. The electronic module could also be located separately on another part of the item of value, for example on the wrist strap. Similarly, other components of the mobile device can be incorporated into the back support or into the cover of the fastening support.

According to a second embodiment variant of the invention, the electronic module is designed to be incorporated into the case of the item of value. In this case, the case is designed to receive the electronic module. In the case in point, it comprises a housing formed in the case in order to receive the electronic module. Preferably, this housing is easily accessible in order to allow easy insertion and removal of the electronic module. The electronic module can then be easily replaced, for example with a more recent version.

According to this second embodiment variant of the invention and in a particular embodiment, the display screen can be merged with the protective glass which is fastened to the watch case.

According to a particular embodiment, the fastening support is designed to receive a wrist strap making it possible to attach the mobile device to the wrist without having to wear a watch. The wrist strap can in particular be attached to the back support of the fastening support. This particular embodiment makes it possible to arrange the autonomous power supply means in the position of the location originally reserved for the watch case.

It should be noted that the mobile device according to the invention, although it is affixed onto an existing item, has all the features for operating autonomously, independently of this item. In the case in point, it comprises the means making it possible to provide a mobile application to a user (electronic module, display screen), without using this item's hardware and/or software resources. Moreover, the mobile device is designed to be affixed onto different, already existing objects, onto products that are available on the market or not, without these items having been designed to receive the mobile device. In particular, the shapes and the dimensions of the fastening support can be designed in order to allow fastening to an existing item. Thus, the mobile device does not constitute a module dedicated to a certain item, but a generic device that can be affixed onto items the shapes and dimensions of which differ or, more generally, an incrementation of standardized generic devices that can be affixed onto a range of items of varying forms and dimensions.

The mobile device can be associated with an interactive platform. The interactive platform, having the general shape of a plate, is capable of being fastened to the mobile device in a detachable manner. It comprises for example means for elastic coupling to the back support of the fastening support. The interactive platform can comprise any communication and information means. By way of example, it can comprise a SIM card or a recess for a SIM card, a near field communication (NFC) tag, a radio-frequency identification (RFID) tag, a one- or two-dimensional barcode (flashcode or QR code). These communication and information means can in particular be used as confidential data carriers, or as keys giving access to systems or secure premises.

A subject of the invention is also an assembly comprising a watch and a mobile device as described previously. The watch can comprise a case in which a housing capable of receiving the electronic module is formed.

A subject of the invention is also an assembly comprising a mobile device and an interactive platform as described previously. The assembly is designed to fasten the interactive platform to the mobile device in a detachable manner. In the case in point, the interactive platform can comprise means for elastic coupling to the mobile device. The interactive platform comprises at least one communication and information means. It can in particular be a SIM card or a recess for a SIM card, a near field communication tag, a radio-frequency identification tag, or a one- or two-dimensional barcode.

A subject of the invention is also an interactive protective casing capable of protecting items, in particular item of values, preferably portable, and capable of being worn by a living being. The interactive protective casing comprises in particular a case intended for receiving item of values, and communication and information means suitable for displaying information to a user and/or exchanging data with another electronic device, for example with the mobile device described above. More precisely, the interactive protective casing according to the invention comprises:
  a case comprising a compartment capable of receiving one or more items to be protected,
  a display screen capable of displaying information, and
  processing means suitable for generating data relating to the information to be displayed.

The case is dimensioned so as to be able to contain at least one item of value, such as a watch, equipped or not equipped with the mobile device described previously, a motor vehicle key, credit card, mobile phone, wallet, jewelry, or an external storage device of the USB stick type. Preferably, it is dimensioned so as to be able to store several items of value, while remaining easily transportable by a person.

The case comprises for example a first part, called the body, and a second part, called the cover, these two parts defining the compartment capable of receiving the item of values. The case can be presented in the form of a belt holster or belt buckle. It is then intended to be worn around a person's waist.

The case can also comprise closing means allowing the case to change from the open position to the closed position, and vice versa. In the open position, it is possible to arrange the item of values in the compartment; in the closed position, the compartment holds the item of values and protects them from the external environment, in particular from impacts and friction, as well as from the risks of loss and possible theft.

According to a particular embodiment, the closing means comprise a hinge formed between the body and the cover in order to allow the change from the open position to the closed position, and vice versa, by a rotational movement between the body and the cover.

According to another particular embodiment, the closing means form a slide connection between the body and the cover. By way of example, the body can comprise one or more grooves, for example U-, L- or T-shaped, and the cover can comprise a male piece with a shape complementary to the groove, so as to allow sliding of the cover relative to the body. The male piece can be integral with the cover. It can also correspond to the peripheral edge of the cover.

The case can also comprise sealing means ensuring sealing between the compartment and the external environment in the closed position. Thus, the items held in the case are protected against any ingress by external elements such as sand, water and dust. The sealing means can in particular comprise a seal arranged between the body and the cover, the case being arranged so that the seal is compressed in the closed position of the case.

In order to secure the case in the closed position, the interactive protective casing can comprise locking means suitable for keeping the case in the closed position. In particular, the locking means can comprise a screw-nut assembly arranged so as to secure the body to the cover in the closed position. In a first embodiment example, the locking means can comprise a threaded element provided in order to pass through the cover and be screwed into a threaded opening arranged on the body, so that the screwing down of the threaded element tightens the cover against the body of the case. In a second embodiment example, the locking means can comprise a threaded element and a nut. The threaded element is provided in order to pass through both the cover and the body, and cooperate with the nut so that the screwing of the threaded element into the nut tightens the cover against the body of the case. These locking means ensure closing of the lock; they can comprise a fingerprint key, a mechanical or electronic key.

With the aim of allowing the secure transport of the interactive protective casing according to the invention, the case advantageously comprises external attachment means. These external attachment means make it possible to attach the protective casing to a part of the living being's body. They can in particular comprise one or more shapes provided to be fastened onto a belt or to receive a belt, a chain, or any means producing a loop around a part of a person's body, such as the waist, arm, neck or leg. For example, the external attachment means can comprise loops for receiving a belt.

With the aim of allowing secure storage of the case, the case can also comprise securing means. These securing means are provided for attaching the case to a secure docking station, the docking station being able in particular to be fastened to a wall, or to an internal wall of a safe or a vehicle. The securing means can comprise any securing shape capable of cooperating with a thus-named engaging shape of the docking station, in order to secure the case to the docking station.

In a non-limitative embodiment example, the securing shape and the engaging shape can form a slide. The slide can comprise a groove formed on the case or the docking station, and a male piece formed respectively on the docking station or the case and sliding in the groove.

In an advantageous embodiment example, the securing shape is produced on a single outer wall of the body part or cover part of the protective casing.

In an advantageous embodiment example, the securing means correspond to the external attachment means. The shape of the case can thus be simplified.

According to an important feature of the invention, the interactive protective casing comprises communication and information means suitable for displaying information to a user and/or exchanging data with another electronic device. In particular, the protective casing comprises a display screen capable of displaying information to a user, in particular the wearer of the protective casing. The display screen is formed on an outer surface of the case, for example on the cover, in order to be viewable by the wearer of the interactive protective casing when it is attached to their belt.

The display screen can be a liquid crystal display (LCD) screen, a light-emitting diode (LED) screen or an organic light-emitting diode (OLED) screen. The screen can comprise Gorilla Glass (registered trade mark) or Willow Glass (trade mark). Other display technologies can of course be used.

The display screen can be a touch screen, in order to form a single interface for entering data and displaying information. The interactive protective casing can also comprise an acquisition interface independent of the display screen, in order to allow the user to enter data.

The interactive protective casing also comprises processing means suitable for generating data relating to the information to be displayed. The processing means can be based on a purely hardware or purely software architecture, or on a combination of the two. In the case in point, they can comprise an electronic circuit, for example a field-programmable gate array (FPGA), a processor or a microprocessor. They can also comprise means for storing data, in particular the software to be run.

According to a particular embodiment, the interactive protective casing also comprises wireless communication means making it possible to communicate data with other pieces of electronic equipment. The wireless communication means can comprise a transmitter-receiver, for example based on Bluetooth technology (IEEE 802.15.1 standard) or Wi-Fi (IEEE 802.11 standard). The protective casing can thus display information relating to the other pieces of electronic equipment, or control these pieces of electronic equipment. In particular, the interactive protective casing can exchange data with the pieces of electronic equipment that it holds, so as to form a remote interface with these pieces of electronic equipment. It is then possible to protect the pieces of electronic equipment while having access to their functionalities. By way of example, the interactive protective casing can make it possible to display and to access an electronic calendar of the user managed by a mobile phone or a personal digital assistant (PDA). The protective casing can also constitute a computer terminal of a computer network, in particular a "cloud computing" network.

Still according to a particular embodiment, the interactive protective casing comprises recharging means making it possible to recharge one or more pieces of electronic equipment arranged in the compartment of the case. The recharging means comprise in particular first connection means for connecting one or more pieces of electronic equipment to an electrical power supply. These first connection means can comprise connecting wires and contact surfaces suitable for ensuring contact with electronic equipment supply points. They can also comprise electric connectors suitable for being connected into electrical sockets of the pieces of electronic equipment arranged in the compartment of the case. The first connection means can also comprise one or more devices for the contactless transfer of energy, for example by induction. Each inductive coupling device can make it possible to recharge several pieces of electronic equipment simultaneously. The electrical power supply can be internal or external to the interactive protective casing. It can in particular comprise an electric accumulator such as a cell or a battery, rechargeable or not. The recharging means can moreover comprise second connection means for connecting the electrical power supply to an external device, for example the docking station to which the interactive protective casing can be attached.

The interactive protective casing can comprise a satellite positioning system receiver, making it possible to locate the protective casing.

According to a particular embodiment, the protective casing comprises an alarm device. The alarm device comprises for example means for controlling the opening of the case, and/or means for signalling an unauthorized opening. The means for controlling the opening of the case can comprise means for authorizing code or card access. The display screen can be used to enter an access code. The means for signalling an unauthorized opening can comprise an audible or visual alarm. They can also comprise means for signalling the unauthorized opening to an external device, for example a mobile phone. The signalling can be accompanied by data relating to the position of the protective casing determined by the satellite positioning system receiver.

The interactive protective casing thus allows several types of use depending on the requirements of the user and the desired level of protection:

A first level of protection is provided by the processing means and the means for wireless communication with the pieces of electronic equipment worn by the user of the protective casing.

A second level of protection is provided by the compartment of the case enclosing the item of values, the protective casing being held in the hand or around the waist of the user.

A third level of protection is provided by arranging a chain linking the protective casing to the wrist or to the waist of the user.

A fourth level of protection is provided by fastening the interactive protective casing to a secure docking station. Docking stations can be installed at different sites.

A fifth level of protection is provided by an anti-intrusion sensor and a satellite positioning system.

A subject of the invention is also a docking station for the interactive protective casing described above. In particular, the docking station comprises:

an engaging shape cooperating with the securing shape of the case in order to position the interactive protective casing on the docking station in a thus-named assembled position, and immobilizing means designed to immobilize the interactive protective casing on the docking station in the assembled position.

The engaging shape is presented for example in the form of one or more tabs designed to be inserted into the securing shape of the case of the protective casing, for example into its loops. The engaging shape and the securing shape then form a slide link between the interactive protective casing and the docking station.

The immobilizing means are designed to immobilize the interactive protective casing on the docking station. In other words, they are designed to eliminate any residual degree of freedom between the protective casing and the docking station. In the case of a slide link, the immobilizing means eliminate the degree of freedom in translation along the axis of the slide link. In an embodiment example, the immobilizing means comprise a stop part and a fastening element. The fastening element is designed to secure the stop part to the engaging shape in a detachable manner. The fastening element can comprise a security screw, i.e. a screw the imprint of which formed on its head has an unconventional shape. The stop part can in particular comprise a support surface coming into contact with a surface of the case in order to prevent movement of the case with respect to the docking station. These immobilizing means ensure closing by means of locking.

More generally, the immobilizing means can be of the same type as the locking means of the interactive protective casing. They can comprise a fingerprint key, a mechanical or electronic key.

BRIEF DESCRIPTION OF THE DRAWINGS

Other advantages and features of the invention will become apparent on reading the detailed description of implementations and embodiments that are in no way limitative, with reference to attached drawings, in which:

FIG. 3 shows, in a three-quarter view, the mobile device of FIGS. 1 and 2 in the open position;

FIG. 4A shows, in a three-quarter view, a closing side cover of the mobile device of FIGS. 1 to 3;

FIG. 4B shows, in a three-quarter view, a part of a fastening support of the mobile device of FIGS. 1 to 3;

DETAILED DESCRIPTION

As the embodiments described below are in no way limitative, it is possible in particular to consider variants of the invention comprising only a selection of characteristics described below, in isolation from the other characteristics described (even if this selection is isolated within a sentence containing these other characteristics), if this selection of characteristics is sufficient to confer a technical advantage or to differentiate the invention with respect to the prior art. This selection comprises at least one, preferably functional, characteristic without structural details, or with only a part of the structural details if this part alone is sufficient to provide a technical advantage or to distinguish the invention from the prior art.

In the remainder of the description, the mobile device according to the invention is considered as being suitable for equipping a watch, and more particularly a case of a wristwatch. However, the mobile device can equip any type of case, for example the case of a health bracelet, a smart watch or a chronometer. More generally, it can equip any item, in particular any item of value, in an autonomous and generic manner. The fastening supports hereafter described in the figures make it possible to successively affix at least the display screen of the generic mobile device onto different items worn by the human being.

Figure 1:
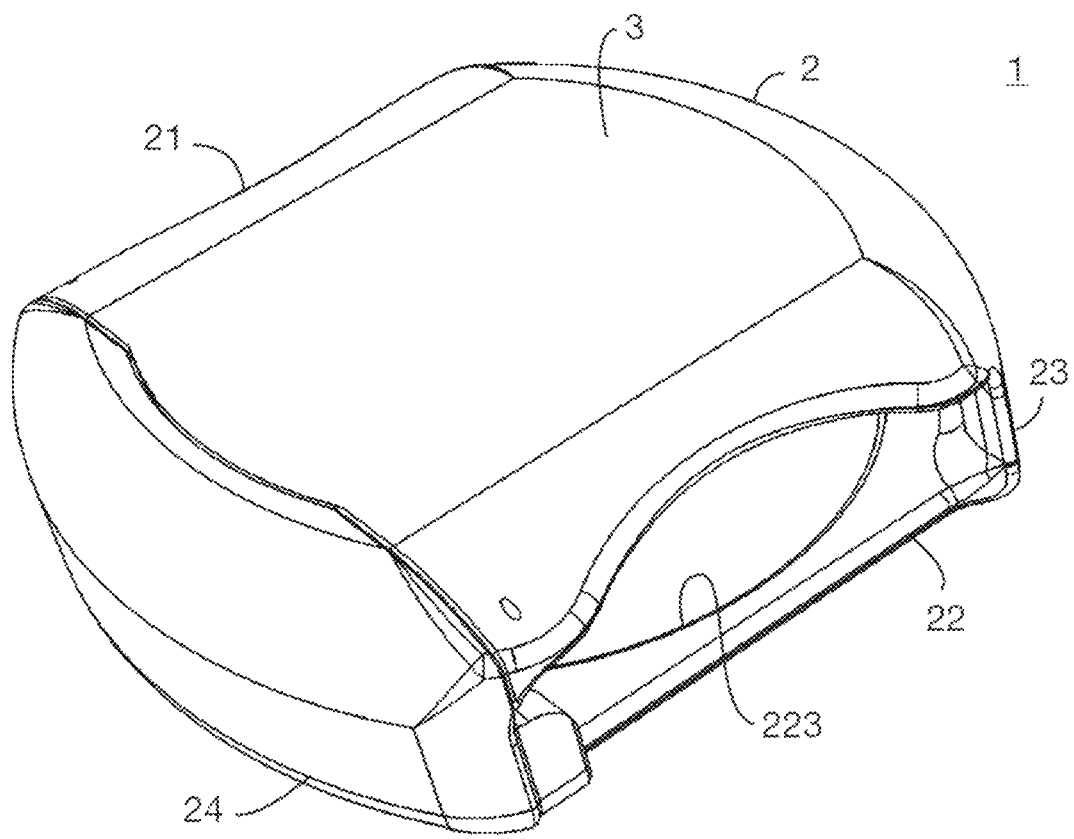
FIG. 1 shows, in a three-quarter view, a first example of a mobile device according to the invention in a closed position.
Figure 2:
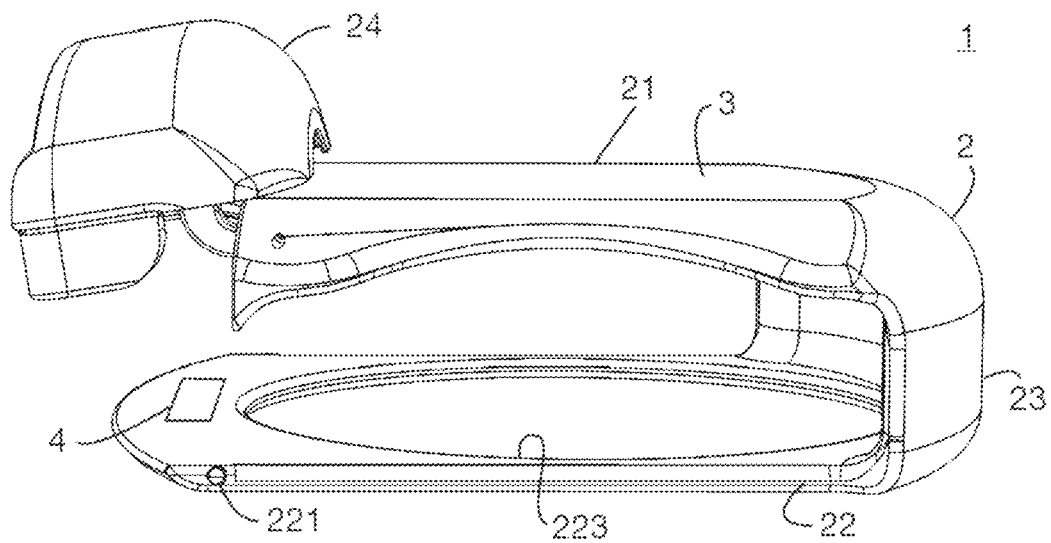
FIG. 2 shows, in a side view, the mobile device of FIG. 1 in an open position.

FIGS. 1 to 4 show, in four different views, a first example of a mobile device according to the invention. FIG. 1 shows, in a three-quarter view, the mobile device in a thus-named closed position. FIGS. 2 and 3 show, in a side view and a three-quarter view, the mobile device in a thus-named open position. FIG. 4A shows, in a three-quarter view from a first viewpoint, a closing side cover of the mobile device. FIG. 4B shows, in a three-quarter view from a second viewpoint, a part of a fastening support of the mobile device. The mobile device 1 comprises a fastening support 2, a display screen 3, an electronic module 4, shown in FIG. 2, and power supply means 5, shown in FIGS. 3 and 4B. The fastening support 2 comprises a first part forming a cover 21, a second part forming a back 22, and a third part, called a side flank 23 linking the cover 21 to the back 22, so as to form a U-shaped profile. This profile is capable of surrounding a case of a watch, as explained below. The fastening support 2 can moreover cover all or part of the horns of the watch case. Preferably, the cover 21, the back 22 and the side flank 23 are formed in a single piece, for example by moulding or three-dimensional printing. The fastening support 2 can also comprise a closing side cover 24 capable of adopting a closed position, as shown in FIG. 1, and an open position, as shown in FIGS. 2 and 3. In the closed position, the fastening support 2 has an O-shaped profile. The change in position is achieved by providing a hinge mechanism. The closing side cover 24 comprises two tabs 241, 242 having first recesses 243, 244 extending along an axis of rotation, and the cover 21 comprises second recesses 211, 212. Pins are accommodated in the recesses 243 and 211 on the one hand, and 244 and 212 on the other hand, so as to form a pivot link. Of course, any other mechanism can be provided in order to make the closing side cover 24 move from the open position to the closed position. The hinge mechanism can be arranged so as to prevent a change in the position of the closing side cover 24 under the effect of gravity or friction against an item. In the case in point, the material of the tabs 241, 242, and that of the cover 21 can be chosen depending on their coefficient of friction. The tabs 241, 242 and the pins can also be adjusted while gripped in the recesses 211, 212, and 243, 244.

According to a particular embodiment, the fastening support 2 also comprises means for locking the position of the closing side cover 24. These locking means can prevent any accidental opening of the closing side cover 24. They consist for example of a mechanism capable of being released by deformation or displacement of an engaging component, such as elastic rings. They can also consist of lugs, screws, nuts, grooves, retainers, or any other suitable means. In the embodiment example of FIGS. 1 to 4, the locking means comprise studs 221 formed on the back 22, and third recesses 245 formed on the closing side cover 24. The studs 221 each cooperate with a recess 245 in the closed position in order to maintain this position.

The fastening support 2 can comprise, as shown in FIGS. 3 and 4, through-holes 231, 232 formed on the side flank 23 for a chain to pass through. The chain can ensure an additional means of attachment of the mobile device to the wrist of the wearer of the watch. It then forms a means for securing the watch and the mobile device. The chain can also allow a user to wear the mobile device around their neck. Of course, the mobile device could comprise any other means of attachment in addition to the fastening support 2, such as for example an autonomous wrist strap.

In the case where the mobile device equips a wristwatch, the back 22 of the fastening support 2 is designed to be able to be accommodated between the back of the watch case and a wrist of the wearer of the watch. The back 22 can have a relatively small thickness, for example less than or equal to 2 millimetres (mm). The fastening support 2 can then be made to fit around the watch case while the latter is already in place on the user's wrist.

With the aim of further reducing the thickness of the back 22, the latter can comprise a recess 223, open or not, into which a part of the back of the watch case is inserted.

The fastening support 2 is preferably formed by a transparent material, for example transparent plastic, silicone, Gorilla Glass (registered trade mark), or transparent ceramic. Other materials, transparent or not, can also be used. If not all of the fastening support 2 is made of a transparent material, it is preferable to produce at least the cover 21 from a transparent material, unless it is desired to completely hide the item of value from prying eyes.

The fastening support 2 forms a device for protecting the watch to which it is fastened. In fact, its O-shape forms a closed contour and defines a protective compartment for the watch. Possible impacts and scratches are no longer directly applied to the watch case, but to the mobile device.

The display screen 3 is for example incorporated into the cover 21. The cover 21 can comprise a through-hole dimensioned in order to receive the display screen 3, so that it forms a part of the cover 21. The display screen 3 can also be arranged on the cover 21, in a bore or extra thickness of the cover 21.

The display screen 3 is advantageously designed to leave visible the surface that it covers, in particular, the first outer surface of the case containing the watch face, in the absence of information displayed on the display screen 3. The display screen 3 has a transmission coefficient greater than or equal to 50%, preferably greater than or equal to 75% in the visible wavelength band. On its periphery, the display screen 3 can have a transmission coefficient of less than 50%, for example due to the presence of its control electronics. However, the control electronics cover a surface area less than 20% of the total surface of the display screen 3. When the mobile device is not in use, the user can therefore view the watch case without being inconvenienced. With the aim of facilitating the reading of the information displayed on the display screen 3, the latter can also be designed so that, when it displays one or more items of information, the watch case is not visible through the display screen. Such a display mode can in particular be achieved by displaying an opaque screen background.

According to a particular embodiment, the display screen 3 is a touch screen. In other words, it comprises means arranged on the display screen forming an acquisition interface for the user. Any type of touch screen technology can be used, in particular resistive touch screens and capacitive touch screens. The display screen 3 can comprise a mechanism for unlocking the acquisition interface in order to avoid any unintentional input. The unlocking mechanism can for example be presented in the form of a cursor to be slid between two predetermined points on the display screen, or along a predetermined path.

The electronic module 4 can be incorporated into the back 22 of the fastening support 2. It can also be arranged other than on the fastening support 2. By way of example, it can be fastened to the strap of the watch equipped with the mobile device.

The electronic module 4 must be capable of running one or more mobile applications. By mobile application, is meant any computer software containing a sequence of instructions carried out in order to perform a given functionality. By way of example, the mobile application can consist of a video game, an electronic organizer, or a digital music reader. Of course, these examples of applications are not limitative and many other applications can be envisaged, depending on the resources of the mobile device.

The electronic module 4 comprises for example a field programmable gate array (FPGA). It can also comprise a software or partially software architecture. The electronic module 4 can then consist of a processor or a microprocessor associated with a memory, for example a flash memory. The memory contains the mobile application(s), and the microprocessor runs them.

Figure 5:
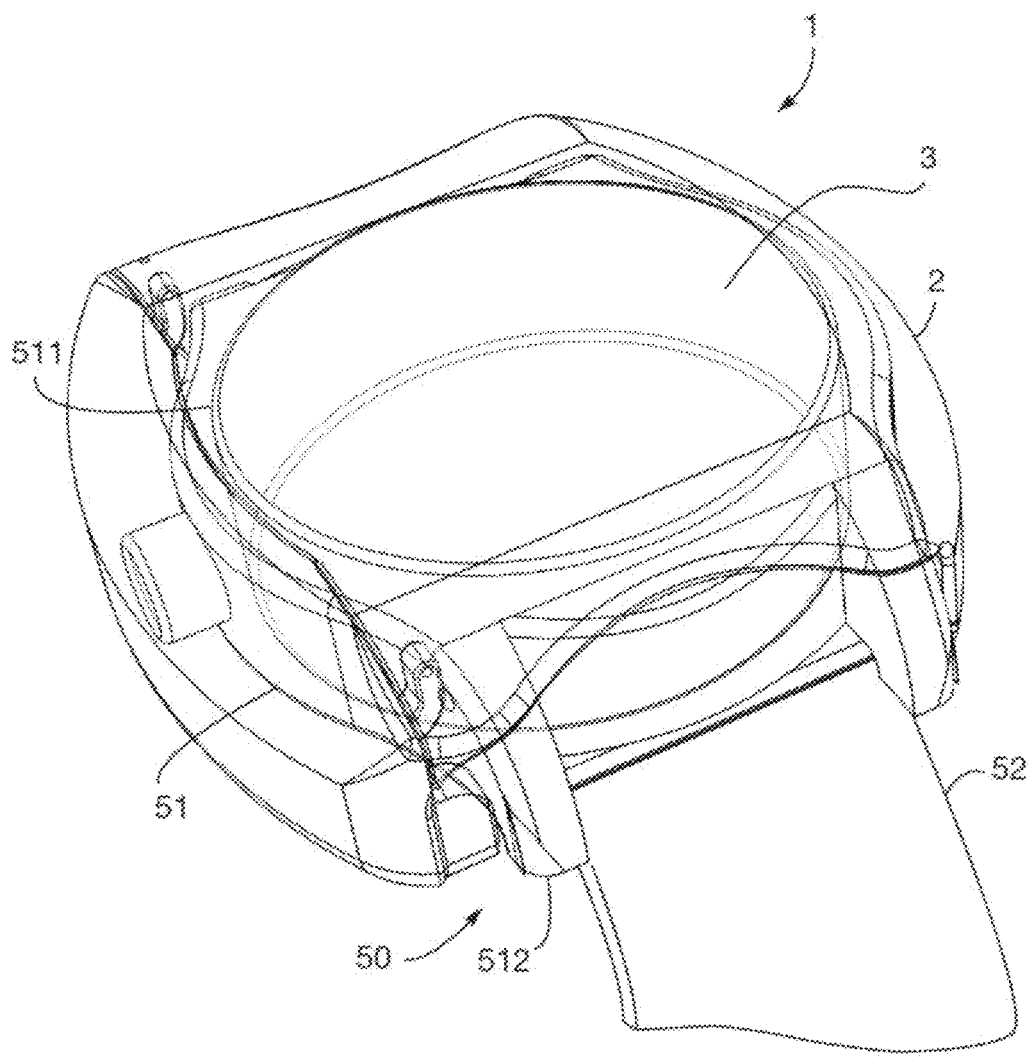
FIG. 5 shows the mobile device of FIGS. 1 to 4 equipping a wristwatch.

FIG. 5 shows the mobile device 1 described with reference to FIGS. 1 to 4 equipping a wristwatch. The wristwatch 50 comprises a case 51, and a watch strap 52. The case 51 has a general cylindrical shape. It comprises an outer surface forming a watch face, a protective glass 511 covering the watch face, and horns of the case 512, to which the watch strap 52 is fastened.

Figure 6:
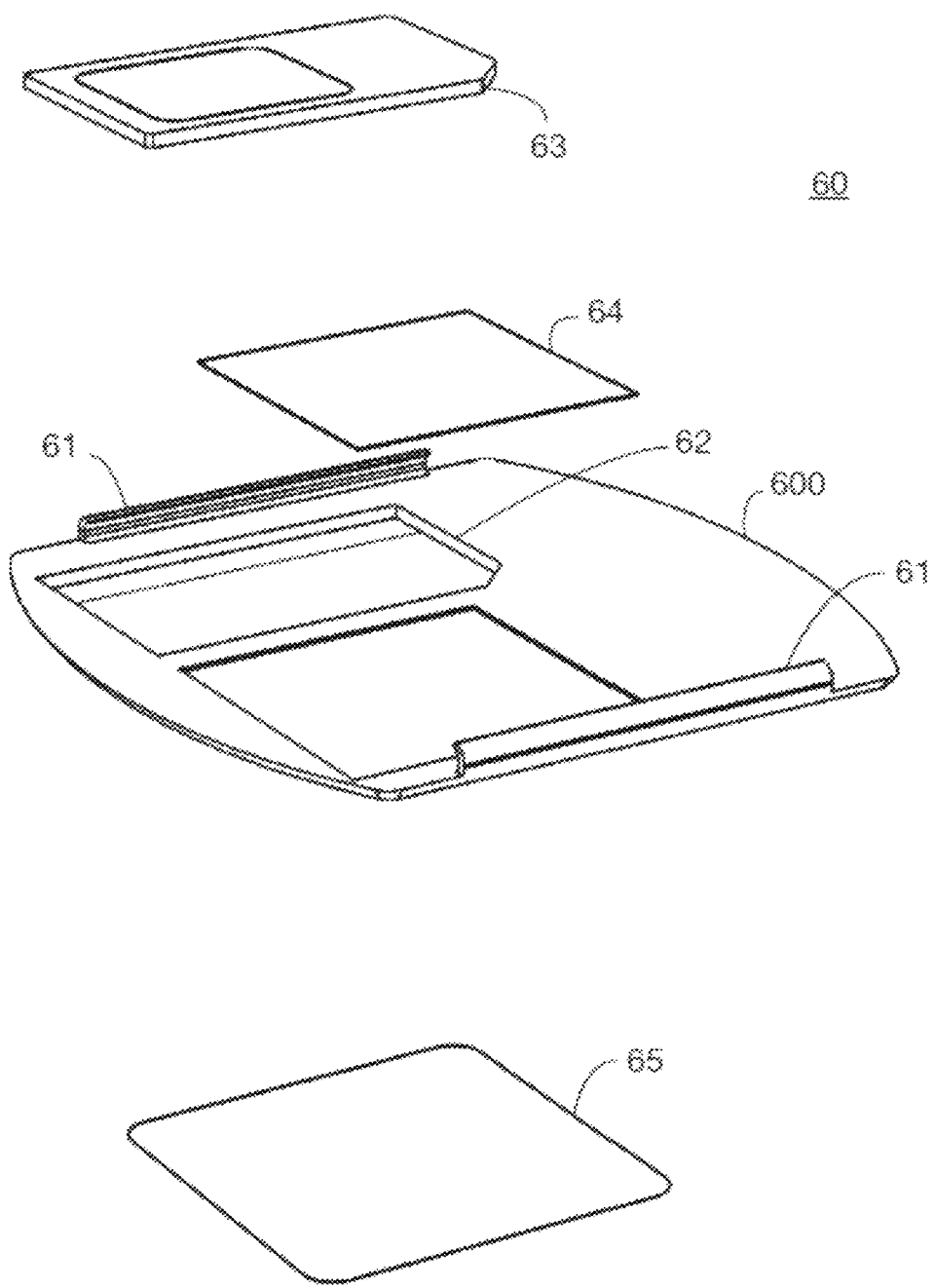
FIG. 6 shows an interactive platform capable of equipping the mobile device of FIGS. 1 to 5.

FIG. 6 shows an interactive platform capable of equipping the mobile device 1 described with reference to FIGS. 1 to 5. The interactive platform 60 for example has the general shape of a plate 600. The plate is preferably sufficiently thin, for example of the order of one millimetre, for it to be positioned between the back 22 of the support 2 and the wrist of a user. The interactive platform 60 comprises two peripheral engaging rims 61 capable of being coupled by elastic deformation to the back support 22 of the support 2. Any other linking means could be provided on the mobile device 1 and/or the interactive platform 60 to make it possible to fasten the interactive platform 60 to the support 2 in a detachable manner. It could in particular be a groove formed in the support 2, in which the interactive platform 60 could slide. In the example of FIG. 6, the interactive platform 60 comprises a recess 62 for a SIM card 63, a near-field communication (NFC) tag 64, and a two-dimensional barcode 65 fastened or printed on the plate 600 (for example a flash code or a QR code). The interactive platform 60 could comprise other communication and information means, such as for example a radiofrequency identification tag, better known as an RFID chip or any contactless smart card. Due to its location, the interactive platform 60, which is interchangeable, forms a relatively secure data carrier. In particular, when the mobile device equips a wristwatch worn by a user, the interactive platform 60 is not visible. It thus makes it possible to store the user's secure data, for example information on their health (medical passport or monitoring of their state of health), banking information and/or electronic keys giving access to buildings, hotel rooms, or vehicles.

Figure 7:
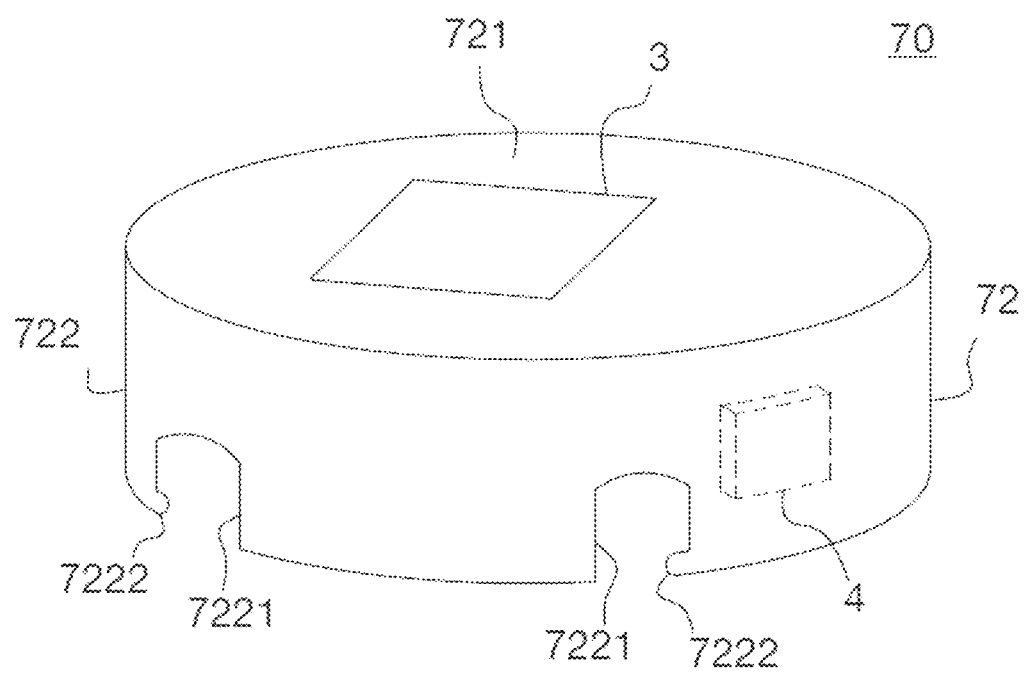
FIG. 7 shows a second example of a mobile device according to the invention.

FIG. 7 shows a second example of a mobile device according to the invention. The mobile device 70 of FIG. 7 essentially differs from the mobile device 1 of FIGS. 1 to 5 in that the fastening support 72 comprises a cover 721, preferably transparent and comprising the display screen 3, and a peripheral rim 722 around the entire perimeter of the cover 721. The peripheral rim 722 is designed to cover the lateral perimeter of a watch case. It can comprise cut-outs 7221 to allow the horns of the watch case to pass through. The peripheral rim 722 can be made of a material having elastic properties, so that the fastening support 72 is coupled to the watch case by elastic deformation. The peripheral rim 722 can in particular comprise lugs 7222, for example at the cut-outs 7221, suitable for being supported on the back of the case, in the case in point under the horns of the case.

In the embodiment example of FIG. 7, the electronic module 4 can be incorporated in the peripheral rim 722.

Figure 8:
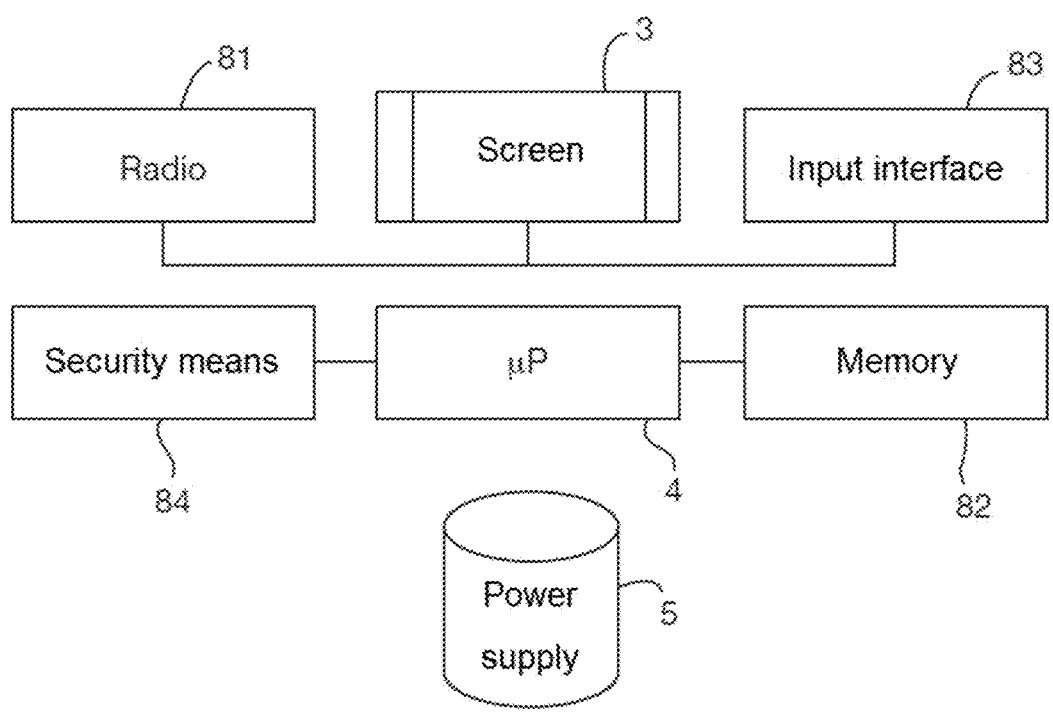
FIG. 8 shows, in the form of a block diagram, an example of a mobile device according to the invention.

FIG. 8 shows, in the form of a block diagram, an example of a mobile device according to the invention. The mobile device 80 comprises a display screen 3 and an electronic module 4. It also comprises wireless communication means 81, data storage means 82, an acquisition interface 83, security means 84, and electrical power supply means 5. The wireless communication means 81 comprise for example a transmitter-receiver based on Bluetooth technology (IEEE 802.15.1 standard) or Wi-Fi (IEEE 802.11 standard). The mobile device according to the invention can then exchange data with other pieces of electronic equipment, in particular in order to control them and/or display on the display screen 3 information contained and/or processed by these pieces of electronic equipment. The data storage means 82 can comprise an electronic data memory. It can in particular be a flash memory. The acquisition interface 83 can comprise pushbuttons. It can also be combined with the display screen 3 in order to form a touch screen. The security means 84 are suitable for generating and/or storing the user's secure data, for example information on their health (medical passport or monitoring of their state of health), banking information and/or electronic keys giving access to buildings, hotel rooms, or vehicles. The security means 84 consist for example of an encryption algorithm, or a storage memory. Said memory is then preferably incorporated in the electronic module 4, or on the same electronic card as the electronic module, in order to prevent removal of the memory without destruction of the mobile device 80. The power supply means 5 are suitable for supplying the mobile device 80 in order make it autonomous in energy. It is for example a button cell. Preferably, the supply means 5 are rechargeable. The mobile device 80 then comprises a wired or wireless socket for recharging the supply means 5 from an external power supply. These power supply means can be incorporated into the mobile device or located separately in the attachment of the wrist strap. They can be supplied by solar energy, by infrared waves, by induction, by arm movement, by the ambient backscatter technique or by the mechanical part of the luxury watch.

Figure 9:
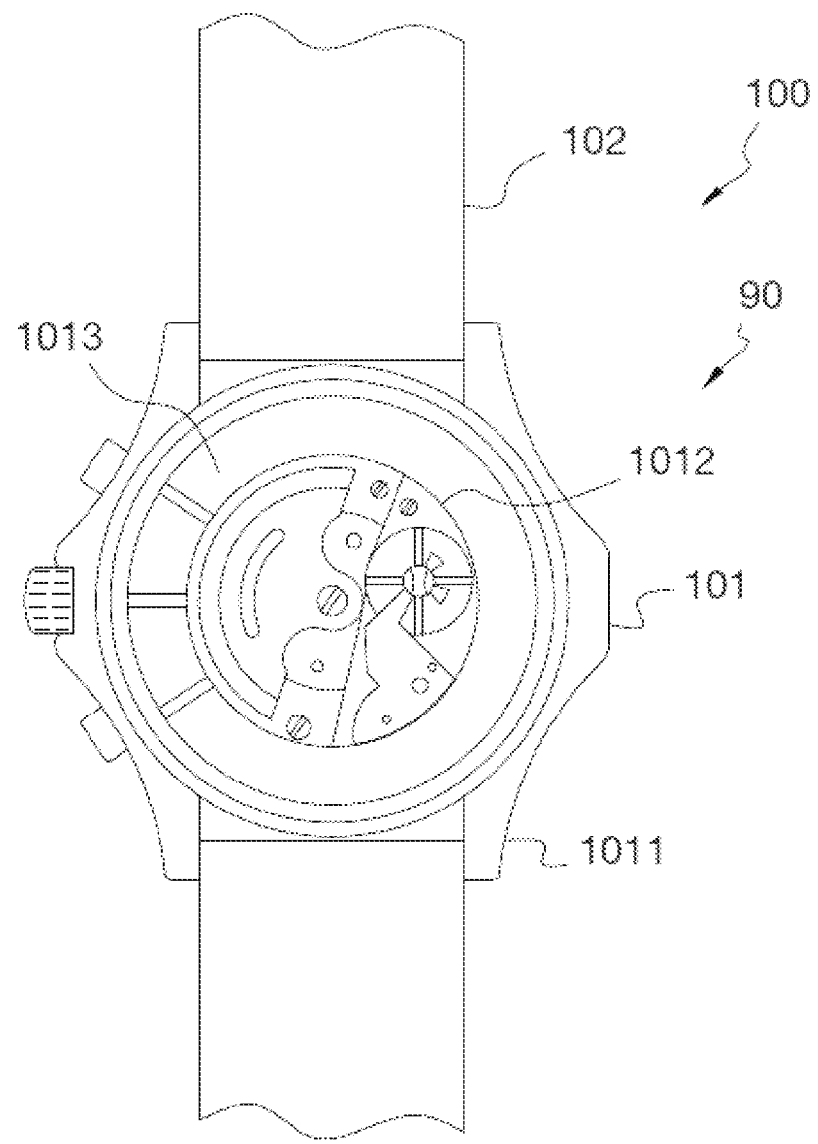
FIG. 9 shows a third embodiment example of a mobile device according to the invention.

FIG. 9 shows a third embodiment example of a mobile device according to the invention. In this embodiment example, the mobile device 90 is partly incorporated into a watch case. The watch 100 comprises a case 101 with its horns 1011 and its mechanism 1012, and a wrist strap 102. The case 101 comprises a housing 1013 designed to receive the electronic module 4, not visible in FIG. 9. Preferably, this housing 1013 is accessible from the back of the case 101, i.e. from the side of the watch opposite to the first outer surface of the case containing the watch face. The case 101 can have a thickness and/or a diameter greater than the nominal thickness and the nominal diameter of the case, in order to receive the electronic module 4 without modifying the mechanism of the watch 100. In the embodiment example of FIG. 9, the housing 1013 is formed on the periphery of the mechanism 1012. It thus has an annular shape. The electronic module 4 and, if appropriate, the wireless communication means, the data storage means, the security means, and the electrical power supply means are arranged so as to have a corresponding annular shape.

The mobile device 90 according to FIG. 9 can, in a manner identical to mobile devices 1 and 70, comprise a display screen arranged on at least a part of the first outer surface of the case comprising the watch face 90. The display screen can be fastened by means of a fastening support 2 or 72, or directly incorporated into the protective glass of the watch case. For this variant of the third embodiment example, the watch case must be designed by a manufacturer specifically to receive an electronic module, in addition to the traditional mechanism. The display screen is therefore, preferably, fastened to the case by the manufacturer. The display screen could optionally be merged with the protective glass. Due to the incorporation of the electronic module 4 into the case 101 of the watch 100, the fastening support 2, 72 can easily have no back as shown in FIG. 7, or have a hole in the back, as shown in FIGS. 1 to 4. Connection means between the display screen and the electronic module are provided. They can in particular comprise a contact interface on the case 101 of the watch 100.

In the different embodiment examples of the mobile device, it is assumed that the display screen has been arranged on a fastened part of the fastening support. In other words, it is assumed that in the configuration where the mobile device equips the item of value, the display screen is secured to the case of the item of value. However, the fastening support can be arranged so as to leave one or more degrees of freedom of rotation and/or of translation between the display screen and the case of the item of value. In particular, the part of the fastening support bearing the display screen can be linked by a pivot or slide to the parts of the fastening support secured to the case.

Figure 10:
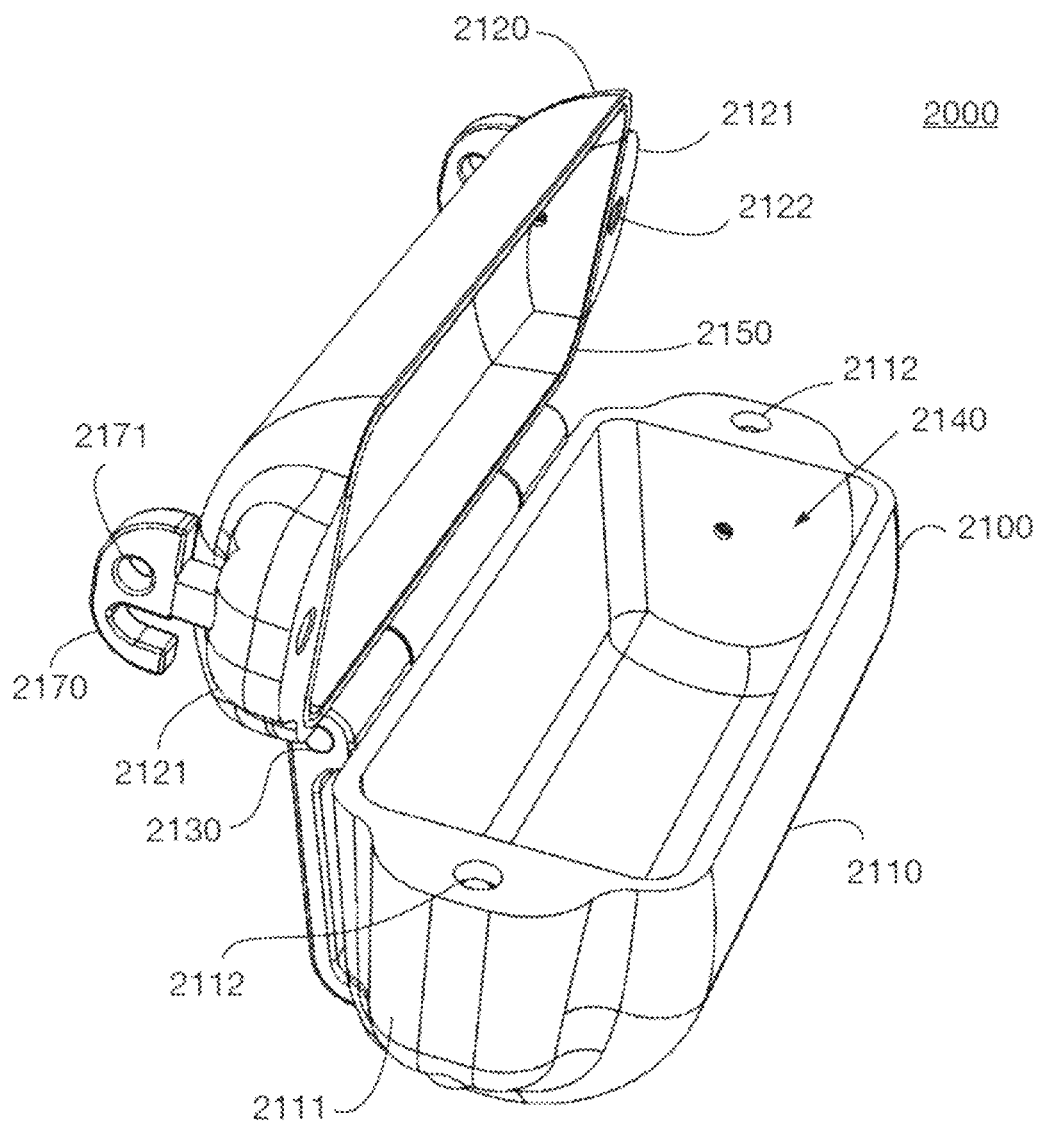
FIG. 10 shows an example of an interactive protective casing according to the invention in an open position.
Figure 11:
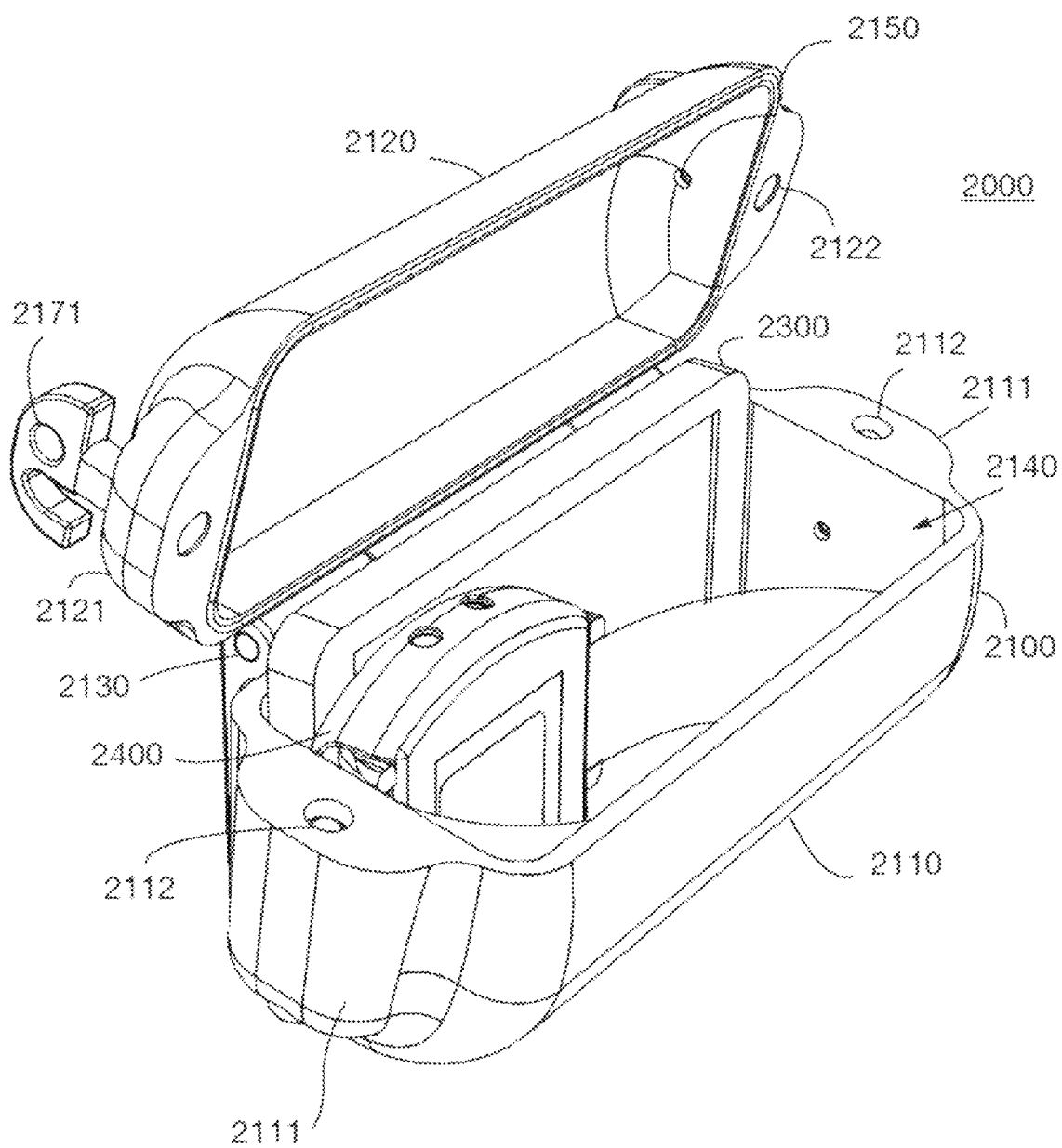
FIG. 11 shows the interactive protective casing of FIG. 10 with item of values arranged inside.
Figure 12:
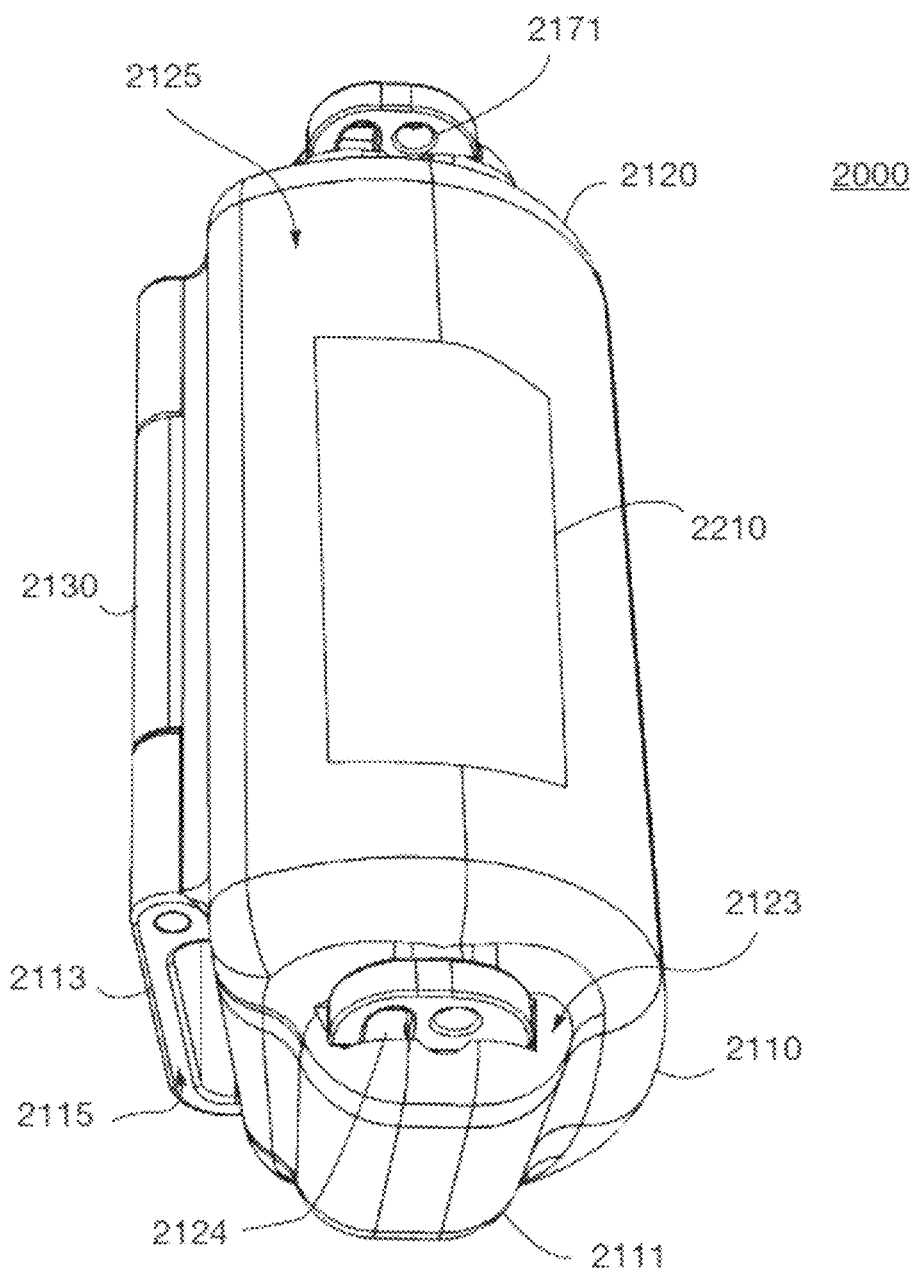
FIGS. 12 and 13 show, in two different views, the protective casing of FIGS. 10 and 11 in a closed position.
Figure 13:
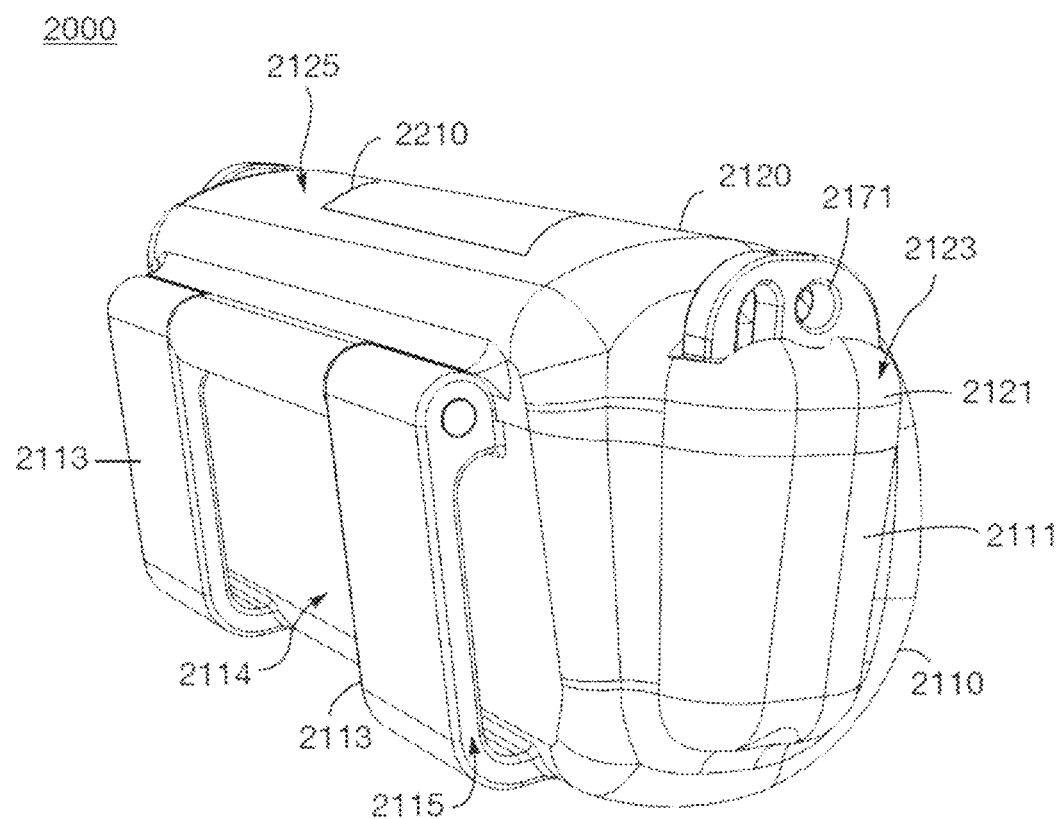

FIGS. 10 to 13 show, in different views, an embodiment example of an interactive protective casing according to the invention. FIG. 10 shows the interactive protective casing in a thus-named open position. FIG. 11 shows the protective casing in the open position with item of values arranged inside. FIGS. 12 and 13 show the protective casing in a thus-named closed position. The protective casing 2000 comprises a case 2100 and communication and information means. The communication and information means are described in more detail with reference to FIG. 14. They comprise in particular a display screen 2210, visible in FIGS. 12 and 13. The case 2100 comprises a body 2110, a cover 2120, and a hinge 2130. The body 2110 and the cover 2120 are hollow in order to form a compartment 2140 capable of receiving item of values such as a watch, bank notes, a credit card, a motor vehicle key, a mobile phone, a USB stick, or the mobile device described previously. In the example shown in FIG. 11, the compartment 2140 contains a mobile phone 2300 and a watch 2400 equipped with the mobile device according to the invention. The compartment 2140 can be divided into several sub-compartments. The hinge 2130 forms a closing means for the case 2100, allowing it to move from the open position, in which the body 2110 and the cover 2120 are separated and make it possible to arrange item of values and gain access thereto, to the closed position, in which the body 2110 and the cover 2120 are joined and close the compartment 2140, so as to protect the item of values from the external environment.

The case 2100 also comprises an O-ring type seal 2150, for example fastened to a joint surface of the cover 2120 and supported on a joint surface of the body 2110 in the closed position.

The case 2100 also comprises locking means for maintaining the case in the closed position. These locking means comprise first projections 2111 formed on the body 2110 of the case, second projections 2121 formed on the cover 2120, screws and nuts 2170. The projections 2111 and 2121 each comprise a through-hole 2112 and 2122, respectively. The through-hole 2112 of each first projection 2111 faces a through-hole 2122 of a second projection 2121, so as to allow a screw to pass through the two corresponding projections 2111 and 2121. The second projections 2121 also comprise, on their top surface 2123, at the through-holes 2122, recesses 2124. These recesses 2124 make it possible to accommodate at least a part of the nuts 2170, and to prevent their rotation when the screws are tightened. The nuts 2170 comprise through-holes 2171 allowing a handcuff chain or a cord to pass through. The chain or cord can be wound around a part of the body of the living being wearing the protective casing, in order to increase security. The screws can be security screws, i.e. screws the heads of which comprise unconventional imprints. Opening the case 2100 is then made more difficult for a person not authorized to use the interactive protective casing 2000. Any other locking means, by a mechanical or electronic lock is possible.

In order to facilitate the transport of the interactive protective casing 2000 by a living being, the case 2100 also comprises loops 2113 formed on a rear surface 2114 of the body 2110. The loops 2113 allow a belt intended to be worn by the living being to pass through. They thus form external attachment means for attaching the interactive protective casing 2000 to a part of the body of a living being, in the case in point to the waist of the living being.

The loops 2113 can also be used as a means for securing to a docking station, as described below.

Figure 14:
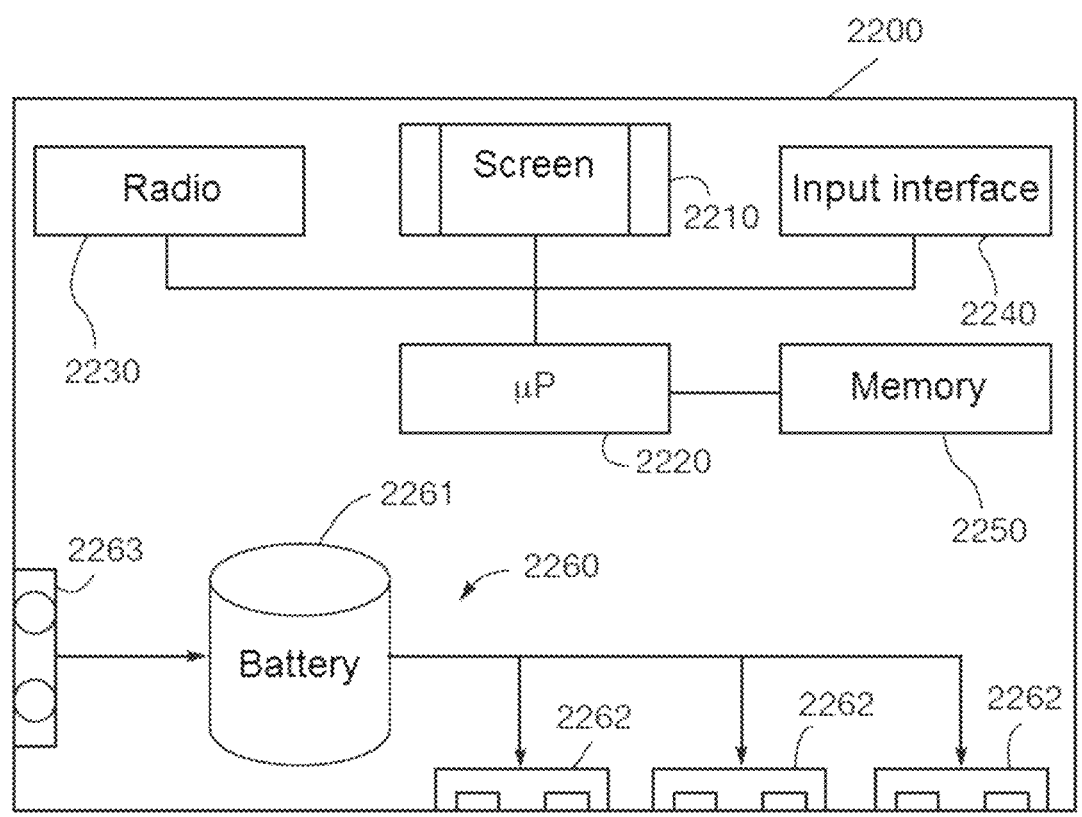
FIG. 14 shows, in the form of a block diagram, an example of communication and information means of the interactive protective casing according to the invention.

FIG. 14 shows, in the form of a block diagram, an example of communication and information means of the interactive protective casing 2000 according to the invention. The communication and information means 2200 comprise a display screen 2210, and processing means such as a microprocessor 2220. They can also comprise wireless communication means 2230, an acquisition interface 2240, data storage means 2250 and recharging means 2260. The display screen 2210 is preferably arranged on a top surface 2125 of the cover 2120. The microprocessor 2220 makes it possible to process data so that it can be displayed by the display screen 2210. It can in particular run software such as a mobile application. The wireless communication means 2230 comprise a transmitter-receiver of electromagnetic waves, for example based on Bluetooth or Wi-Fi technology.

The acquisition interface 2240 can comprise pushbuttons and/or a touch interface formed on the display screen 2210. The data storage means 2250 can comprise a memory, for example a flash memory capable of storing computer data. They can be detachable or not. In the case where they are detachable, they are preferably accessible from inside the compartment 2140 of the case 2100. The recharging means 2260 comprise an electric accumulator 2261, for example a rechargeable battery, electrical connectors 2262 connected to the electric accumulator 2261, and a supply socket 2263 also connected to the electric accumulator 2261. The supply socket 2263 can be connected to an external power source, for example using the docking station described below, so as to recharge the electric accumulator 2261. The electrical connectors 2262 are suitable for being connected to pieces of electronic equipment placed in the compartment 2140. The supply socket 2263 and the electric connectors 2262 can be in the form of contact surfaces, or of a plug or socket. They could also be replaced by contactless energy transfer devices, for example inductive coupling devices. The communication and information means 2200 could also comprise security means analogous to the security means 84 described with reference to FIG. 8.

Figure 15:
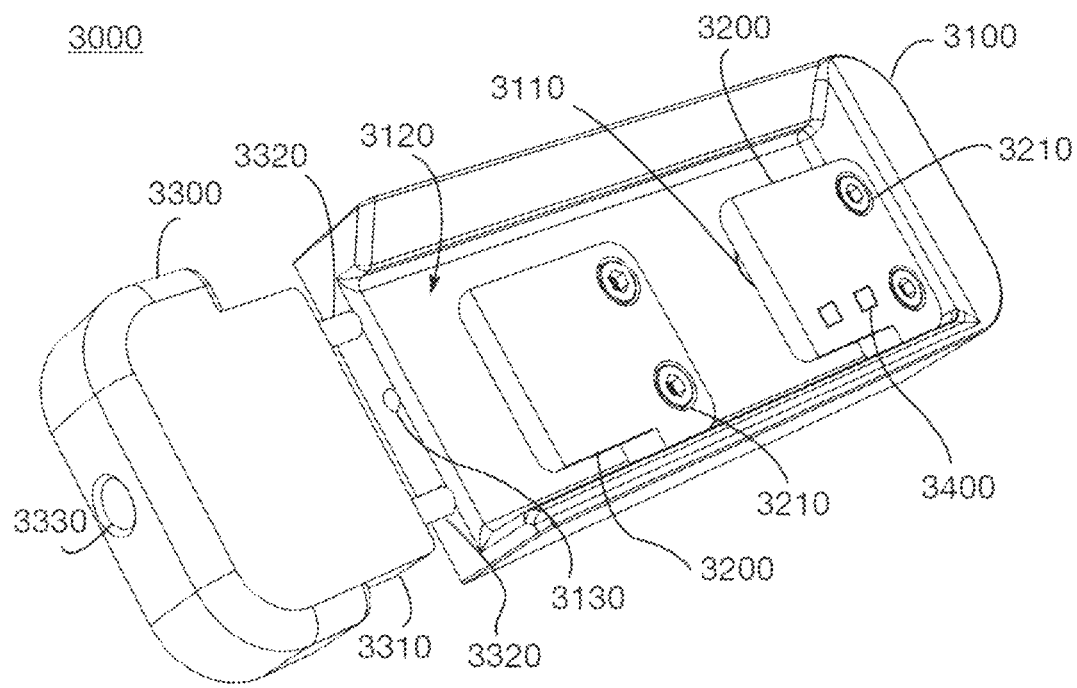
FIGS. 15 and 16 show, in two different views, an example of a docking station according to the invention to which the interactive protective casing can be secured.
Figure 16:
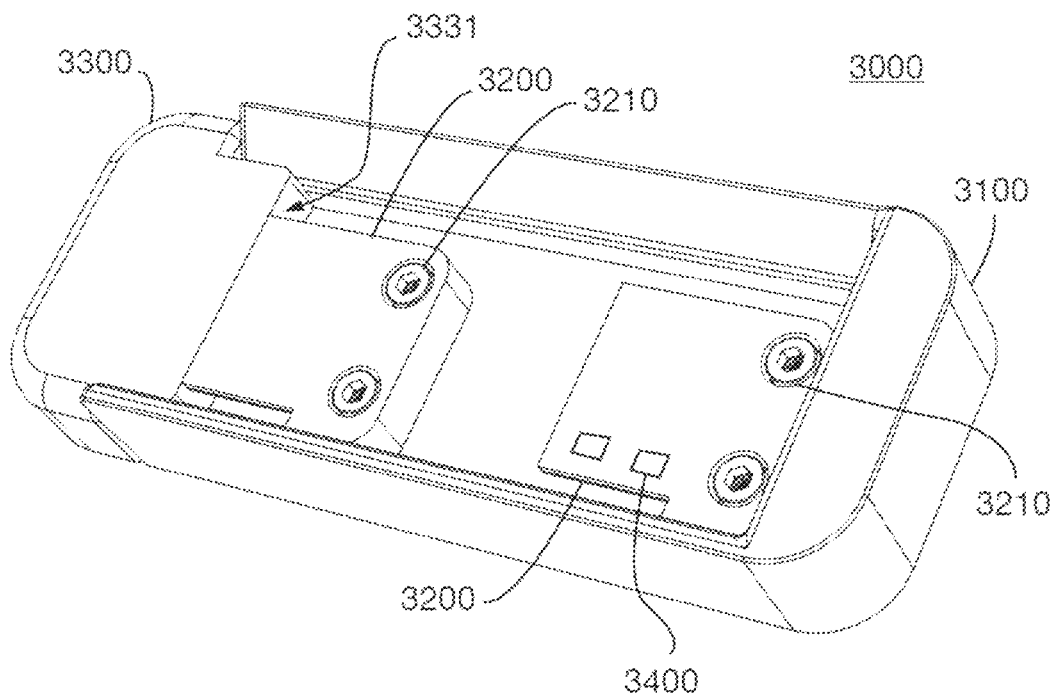

FIGS. 15 and 16 show, in two different views, an example of a docking station according to the invention to which the interactive protective casing can be secured. FIG. 15 shows the docking station in a thus-named unlocked position, and FIG. 16 shows the docking station in a thus-named locked position. The docking station 3000 comprises a base 3100, two tabs 3200, a locking piece 3300 and a screw, not shown. The base 3100 is designed to be fastened to a support, for example a wall of a building, a chassis of a motor vehicle, or a wall of a safe. It can in particular comprise two through-holes 3110, a single one of which is partially visible in FIG. 15, to allow fastening means such as screws to pass through, and to allow the tightening of the base 3100 against the support. The base 3100 comprises for example an indentation 3120 open at one end and forming a U-shaped section. The case 2100 can then slide into the indentation 3120 until it comes to a stop in a thus-named assembled position. The tabs 3200 extend along the axis of movement of the case 2100 with respect to the docking station 3000. They are fastened to the base 3100 by screws 3210. The screws 3210, like the screws allowing the base 3100 to be fastened to the support are preferably inaccessible when the interactive protective casing 2000 is in the assembled position. The locking piece 3300 comprises a support piece 3310, guide rods 3320, and a through-hole 3330. The guide rods 3320 make it possible to guide the lock piece 3300 along the same axis as the axis of movement of the case 2100 with respect to the docking station 3000. The support piece 3310 comprises a support surface 3331 capable of coming into contact with a surface 2115 (visible in FIGS. 12 and 13) of the loops 2113, so as to prevent the removal of the case 2100 from the docking station 3000. The through-hole 3300 can receive a screw, preferably a security screw, which can be screwed into a threaded hole 3130 made in the base 3100. The security screw can be screwed in order to lock the locking piece 3300 onto the base 3100.

The docking station 3000 also comprises connection means 3400 capable of being connected to the supply socket 2263 of the interactive protective casing. These connection means 3400 are for example connected to an external electrical power supply, for example to the electricity network of a home or vehicle.

Of course, the invention is not limited to the examples which have just been described and numerous adjustments can be made to these examples without exceeding the scope of the invention. Furthermore, the different characteristics, forms, variants and embodiments of the invention can be combined with each other in various combinations insofar as they are not incompatible or mutually exclusive.

The invention claimed is:

1. A mobile device capable of protecting and equipping, by superimposition, a watch comprising a case, the case comprising a first outer surface intended to be easily visible to a user to tell time, the mobile device comprising:
   an electronic module capable of running a mobile application,
   a display screen connected to the electronic module and designed to display information relating to the mobile application, and
   a fastening support the shapes and dimensions of which are designed so that the mobile device can equip the watch, in order to be able to fasten at least the display screen to the watch in a detachable manner and by superimposition,
   the mobile device being designed so that, when the display screen is fastened to the watch worn by the user, it covers at least a part of the first outer surface of the case, and
   the display screen being designed so as to leave the first outer surface visible in the absence of information displayed on the display screen.

2. The mobile device according to claim 1, wherein the display screen is a touch screen, so as to form an acquisition interface for a user.

3. The mobile device according to claim 1, wherein all or part of the fastening support is made of a transparent material.

4. The mobile device according to claim 1, further comprising wireless communication means suitable for exchanging data with an electronic device.

5. The mobile device according to claim 4, wherein the wireless communication means are designed to be able to remotely control the operation of the electronic device.

6. The mobile device according to claim 1, further comprising encryption means for data generation and/or storage.

7. The mobile device according to claim 1, wherein the first outer surface is visible to the user when wearing the watch.

8. The mobile device according to claim 1, wherein the fastening support comprises a cover designed so that, when the display screen is fastened to the watch, the cover covers at least a part of the first outer surface of the case.

9. The mobile device according to claim 8, wherein the display screen forms all or part of the cover of the fastening support.

10. The mobile device according to claim 8, wherein the case of the watch comprises a second outer surface forming a back of the case, the fastening support further comprising a back support designed so that, when the fastening support is fastened to the watch, the back support covers at least a part of the back of the case, the cover and the back support defining between them a protective compartment capable of receiving the case.

11. The mobile device according to claim 10, wherein the fastening support further comprises a side flank mechanically linking the cover and the back support so as to form a U, the fastening support further comprising a closing side cover capable of adopting an open position, so as to allow the fastening support to be put in place on the case by sliding, and a closed position, in which the closing side cover closes an open portion of the U.

12. The mobile device according to claim 10, wherein the electronic module is incorporated into the back support of the fastening support.

13. The mobile device according to claim 1, wherein the watch comprises a wrist strap capable of attaching the case to the wrist of the user, the mobile device further comprising supply means suitable for supplying it with energy, the supply means being designed to be fastened onto the wrist strap of the watch.

14. The mobile device according to claim 1, wherein the electronic module is designed to be incorporated into the watch.

15. An assembly comprising a mobile device according to claim 14 and a watch, the watch comprising a housing capable of receiving the electronic module of the mobile device.

16. An assembly comprising a mobile device according to claim 1, and an interactive platform, the assembly being designed to be able to fasten the interactive platform to the mobile device in a detachable manner, the interactive platform comprising a communication and information means such as a SIM card, a near field communication tag, a radio-frequency identification tag, or a one- or two-dimensional barcode.

* * * * *